March 11, 1930.    R. H. PATCHEN ET AL    1,750,328
APPARATUS FOR ARRANGING AND MAGAZINING ARTICLES
Filed June 16, 1926    2 Sheets-Sheet 1
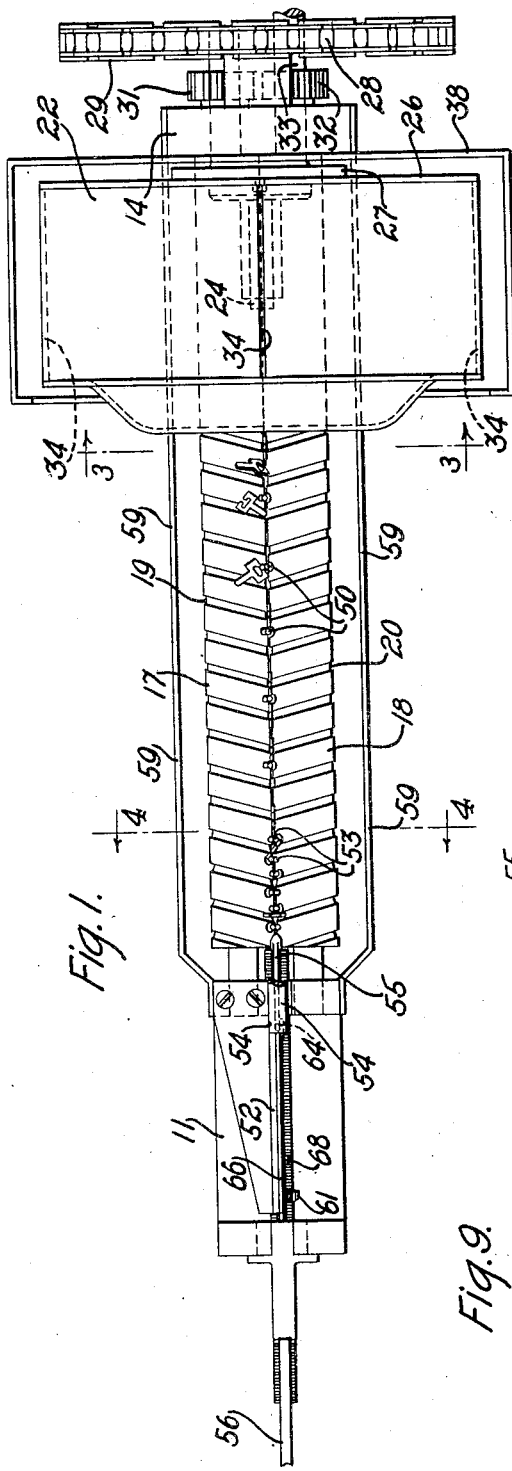
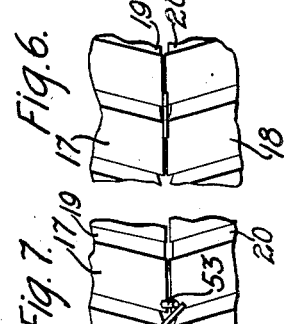
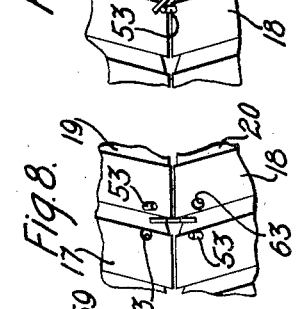
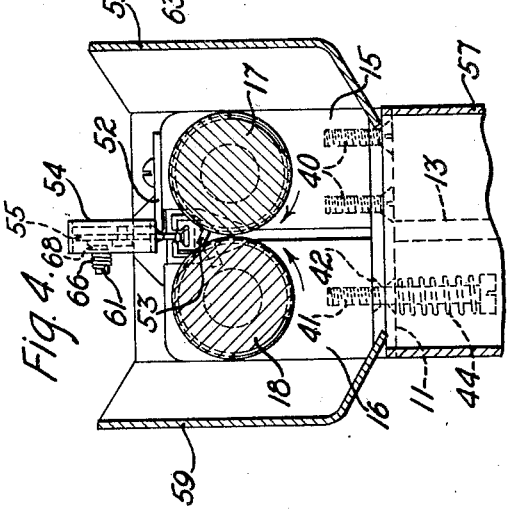
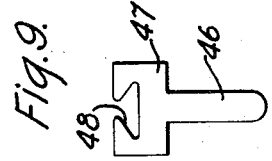
Inventors:
Robert H. Patchen
George L. Rock
by [signature] Att'y.

March 11, 1930.   R. H. PATCHEN ET AL   1,750,328
APPARATUS FOR ARRANGING AND MAGAZINING ARTICLES
Filed June 16, 1926   2 Sheets-Sheet 2
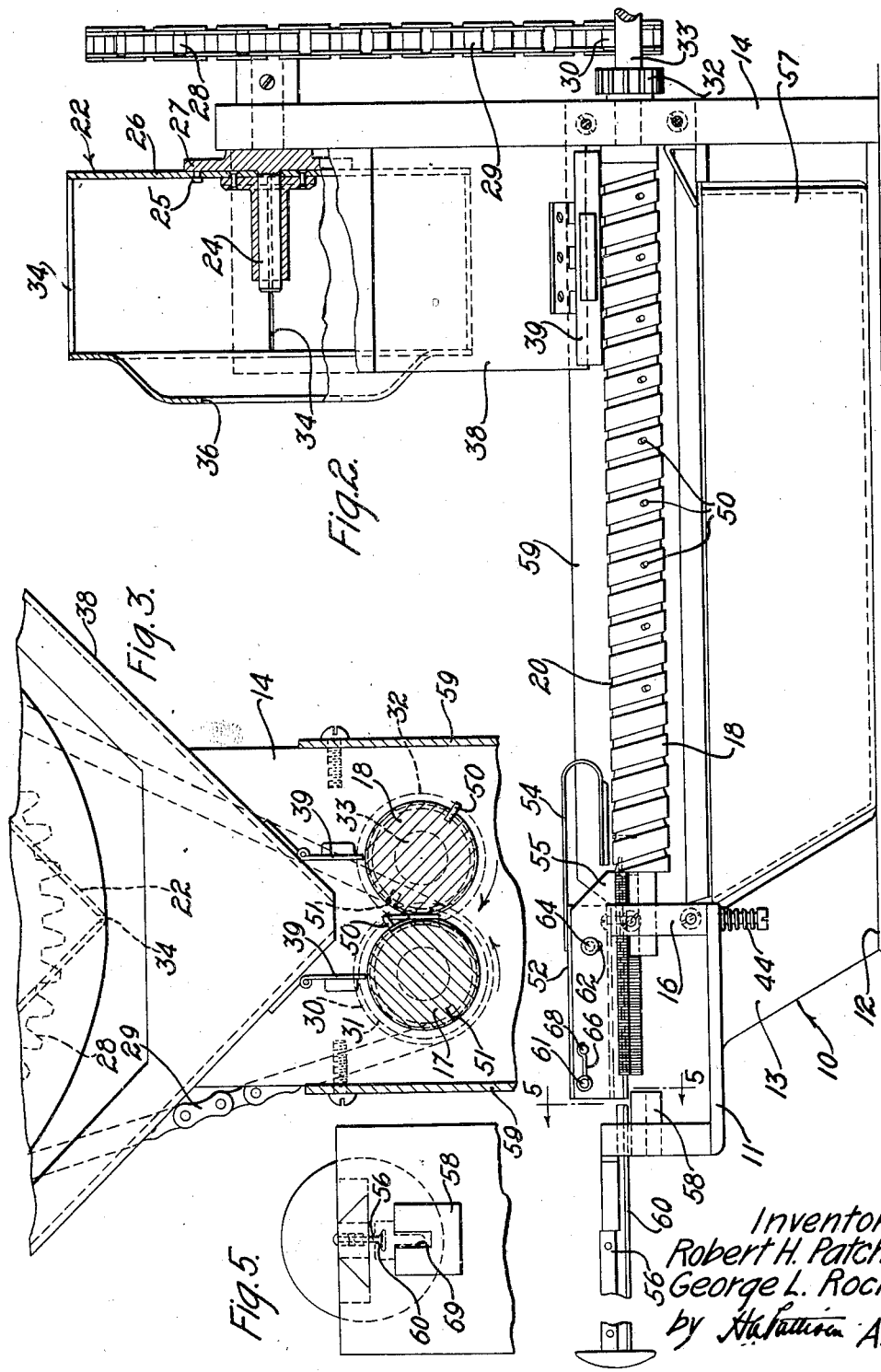
Inventors:
Robert H. Patchen
George L. Rock
by *Patterson* Att'y.

Patented Mar. 11, 1930

1,750,328

UNITED STATES PATENT OFFICE

ROBERT HAND PATCHEN, OF CHICAGO, AND GEORGE LYNDEN ROCK, OF CICERO, ILLINOIS, ASSIGNORS TO WESTERN ELECTRIC COMPANY, INCORPORATED, OF NEW YORK, N. Y., A CORPORATION OF NEW YORK

APPARATUS FOR ARRANGING AND MAGAZINING ARTICLES

Application filed June 16, 1926. Serial No. 116,491.

This invention relates to apparatus for arranging and magazining articles, and more particularly to apparatus for arranging and magazining articles in predetermined positions for assembling purposes.

Where small parts are to be assembled in predetermined positions, it has heretofore been the practice in some instances for a worker to manually select the parts from an indiscriminately arranged supply thereof and manually magazine the parts so selected in predetermined properly arranged positions for assembling with other parts. One instance of this practice may be found in the manufacture of induction coils such as are extensively used in telephone systems. The cores of certain types of these coils are provided at each end with suitable terminals for electrically interconnecting them in telephone circuits. When assembling these coils, it has heretofore been the practice in some cases for a worker to manually select the terminals from an indiscriminately arranged supply thereof and then manually magazine the terminals so selected in predetermined properly arranged positions for assembling with the core members.

The principal object of the present invention is to provide an improved apparatus for effectively and efficiently arranging and magazining articles in predetermined positions.

In accordance with the general features of the invention, there is provided, in one embodiment thereof, a rotatable receptacle having a plurality of slots through which promiscuously arranged articles are deposited upon a pair of oppositely rotating screw members having oppositely disposed spiral ways or grooves designed to advance properly positioned articles and provided with means for turning each article to a predetermined position for loading on a magazine and thereafter advancing the positioned article upon the magazine. Improperly positioned articles are agitated by means of a plurality of pins carried by the screw members which serve to either eject or kick them into proper positions for turning. A resilient spring positioned above the screw members at the discharge ends thereof serves to guide properly positioned articles while being turned.

Other features and advantages of the invention will become apparent in the following detailed description, reference being had to the accompanying drawings, wherein Fig. 1 is a plan view of an apparatus embodying the features of the invention;

Fig. 2 is a side elevation thereof, partly in section;

Fig. 3 is an enlarged fragmentary vertical section taken on line 3—3 of Fig. 1;

Fig. 4 is an enlarged fragmentary vertical section taken on line 4—4 of Fig. 1;

Fig. 5 is an enlarged fragmentary detail section taken on line 5—5 of Fig. 2;

Figs. 6, 7 and 8 are enlarged fragmentary plan views of portions of the screw members showing several steps in the turning of an article to a predetermined position, and Fig. 9 is an enlarged detail view of an article adapted to be arranged and magazined in a predetermined position by the improved apparatus.

Referring now to the drawings in detail wherein like reference characters designate corresponding parts throughout the several views, the numeral 10 indicates a main supporting member for the improved apparatus comprising a section of an I-beam having the usual upper and lower flanges 11 and 12, respectively, and a web portion 13. Secured at one end of the member 10 is a vertical standard 14, and mounted near the opposite end of the frame member are a pair of bearing blocks 15 and 16 (Fig. 4). Rotatably journaled in suitable bearings formed in the standard 14 and blocks 15 and 16 are a pair of horizontally disposed screw members 17 and 18 having oppositely disposed spiral ways or grooves 19 and 20, respectively.

A receptacle or hopper 22 designed to hold a supply of articles to be magazined is removably secured to a spindle 24 by means of a latch pin 25 engaging an aperture in a vertical wall 26 of the receptacle and secured to a disk 27 formed integral with the spindle. The spindle is rotatably mounted in the upper end of the standard 14 and has secured thereto a sprocket 28 by means of which it is driven from the screw member 17 by a sprocket chain 29 and a sprocket 30 secured to the screw member 17. The screw member 17 is in turn driven from the screw member 18 by means of spur gears 31 and 32 secured to the screw members 17 and 18, respectively. The screw member 18 may in turn be driven from any suitable source of power connected to an outwardly projecting reduced portion 33 thereof.

It will be noted (Figs. 1 and 2) that the hopper 22 is substantially rectangular in shape and is provided at each corner with a narrow rectangular slot 34 through which articles contained therein are deposited upon the screw members 17 and 18 while the receptacle is rotating. The construction is such that only a few articles at a time are deposited upon the screw members thus preventing overloading. The front side of the hopper 22 is provided with a circular opening 36 through which articles may be introduced into the hopper without necessarily stopping the operation of the apparatus. A funnel shaped housing 38 (Fig. 3), positioned below the hopper 22 and enclosing the lower portion thereof, serves to guide the articles deposited by the rotating hopper into the V-shaped groove formed by the screw members 17 and 18. Pivoted to the side walls of the housing 38 and extending to the surface of the screw members are a pair of plate members 39 which serve to hold the articles within the V-shaped groove formed by the screw members. This construction provides a flexible guide for the articles which eliminates any danger of damage due to overloading or jamming, it being obvious that a slight pressure by the articles against the members 39 due to excessive loading is sufficient to move these members outwardly, thereby permitting the excess articles to fall over the outer sides of the screw members.

The screw members 17 and 18 are journaled at their forward or discharge ends in suitable bearings formed in the blocks 15 and 16. As shown in Fig. 4, the bearing block 15 is rigidly secured to the upper flange 11 of the frame by means of a plurality of screws 40. The bearing block 16, however, is pivotally mounted so as to be movable towards and away from the block 15. A bolt 41 engaging an aperture 42 in the upper flange 11 is threaded at one end into the block 16. A compression spring 44 encircling the bolt 41 and interposed between the head of the bolt and the upper flange 11 serves to normally urge the block 16 downwardly so that its lower surface is flush with the upper surface of the flange 11. Under normal conditions, the screw members 17 and 18 are in contact under slight pressure. If for any reason a part clings to one of the screw members and is carried around and upwardly between these members, the screw member 18 is moved away from the screw member 17 against the tension of the spring 44, thereby allowing the part to pass, thus preventing any possible damage.

The apparatus illustrated in the drawings is particularly designed for arranging and magazining terminals of the type shown in Fig. 9. These terminals comprise a prong or tip portion 46 and an enlarged head portion 47 having a dove-tail slot 48 formed therein. Due to the particular arrangement of the hopper with the slots therein parallel to the axes of the screw members, the terminals naturally tend to drop into the V-shaped groove formed by the screw members with their planes parallel to the axes thereof. The screw members are designed so that the spiral grooves thereof form a common groove or way so shaped that only the prong or tip portion 46 of the terminal could enter. The screw members are driven in the direction indicated by the arrows in Fig. 3, the inner sides thereof turning in an upward direction. A plurality of pins 50 projecting from the surface of the screw members serve to agitate the improperly positioned terminals, causing them to become properly lodged within the spiral ways, as shown in Figs. 3 and 6. During the rotation of the screw members, the pins 50 engage companion apertures 51 provided in each of the screw members.

Near the discharge ends of the screw members, the properly positioned advancing terminals are turned to a crosswise position (Fig. 8) by a pair of pins 53, one of which is provided in each screw member. Several sets of these pins may be provided and may be positioned in staggered formation around the screw members so as to insure that all properly positioned terminals are turned to a crosswise position. The pins 53 also serve to eject improperly positioned terminals as they approach the discharge ends of the screw members. A suitable pan 57 may be provided for collecting terminals which are ejected from or fall over the sides of the screw members. A pair of plate members 59 secured to the standard 14 and blocks 15 and 16 serve to guide ejected terminals into the pan 57.

Figs. 6, 7 and 8 illustrate several steps in the operation of arranging a terminal in position to be magazined. Due to the rotation of the screw members and the action of the agitating pins 50, the terminals are caused to become lodged between the screw members so that the prong portions thereof are disposed within the spiral way formed by the cooperating grooves 19 and 20, as clearly shown in Fig. 6. The rotation of the screw members causes a terminal so positioned to be advanced along the continuous spiral way until it is encountered by a pair of the turning pins 53 which are arranged so as to engage opposite sides of the terminal, as shown in Fig. 7. Upon engaging the terminal, the pins 53 tend to slightly lift it out of the spiral grooves 19 and 20, thereby permitting it to be turned to a crosswise position, as shown in Fig. 8. During the rotation of the screw members the pins 53 engage apertures 63 provided in each of the screw members.

Secured to a bracket 52 mounted on the bearing block 15 is a substantially U-shaped leaf spring 54, one side of which is positioned immediately above and in vertical alignment with the advancing terminal. This leaf spring serves to prevent displacement of the terminals as they are turned to a crosswise position by the turning pins 53.

After being turned, the terminals are advanced by the cooperating spiral grooves 19 and 20 onto a receiving or guide rail 55 which is positioned to enter the dove-tail slot 48 formed in the head portion 47 of the terminals. The action of the spiral grooves feeding the parts onto the guide rail moves them along the rail and onto a magazine 56 which is removably supported in alignment therewith. A bridge-like member 58 provided with a groove 69 designed to accommodate the tip of the terminals serves to guide the terminals as they are advanced from the guide rail onto the magazine. The magazine 56 may be of any suitable construction, being preferably provided with rail portions 60 designed to engage the dove-tail slot 48 of the terminals, as best shown in Fig. 5.

The receiving rail 55 is preferably pivotally mounted on a pin 61 secured to the bracket 52. A pin 64 secured to the bracket 52 engages a slot 62 formed in the forward end of the rail. A helical spring 66 encircling the pin 61 serves to normally urge the forward end of the rail downwardly so as to be in alignment with the dove-tail slot of the advancing terminals. One end of the spring 66 is attached to the pin 61 and its opposite end engages a pin 68 secured to the rail 55. The construction just described permits the forward end of the rail to move upwardly when encountered by a defective terminal to allow such terminal to pass underneath, thereby eliminating any possibility of jamming.

Although the invention is herein illustrated and described in connection with an apparatus which is particularly suitable for arranging and magazining induction coil terminals, it is to be understood that the novel features thereof are capable of other applications and should be limited only by the scope of the appended claims.

What is claimed is:

1. In an apparatus for arranging articles, a screw mechanism comprising a pair of parallel screw devices for advancing an article indiscriminately associated therewith, said screw devices having means formed thereon for arranging the advancing article into a predetermined position.

2. In an apparatus for arranging articles, a screw mechanism comprising a pair of oppositely rotating parallel screw members having oppositely disposed spiral ways designed to advance an article, and means associated with one of said screw members for arranging an advancing article into a predetermined position.

3. In an apparatus for arranging articles, a pair of parallel screw members having cooperating spiral ways for receiving and advancing an article indiscriminately associated therewith, and means carried by one of said screw members for arranging an advancing article into a predetermined position.

4. In an apparatus for arranging and magazining articles, a screw mechanism for properly positioning articles indiscriminately associated therewith, said screw mechanism having a spiral way for advancing properly positioned articles, means carried by the screw mechanism for arranging advancing articles into a predetermined position, a magazine for receiving properly arranged articles, and means for ejecting improperly arranged articles.

5. In an apparatus for arranging articles, a rotatable hopper, a pair of parallel screw members for advancing an article supplied thereto by said hopper, means for properly directing an article from the hopper into a position between the screw members, and means for arranging an advancing article into a predetermined position.

6. In an apparatus for arranging and magazining articles, a screw mechanism for properly positioning and advancing an article, means for receiving properly positioned articles, a rotatable hopper for continually supplying indiscriminately arranged articles to said screw mechanism, and means for properly directing articles from the hopper to the screw mechanism.

7. In an apparatus for arranging articles, a pair of parallel screw members for receiving and advancing an article, and a pin carried by one of said screw members and cooperating with the other screw member to arrange an advancing article into a predetermined position.

8. In an apparatus for arranging articles, a pair of parallel screw members for receiving and advancing an article, a pin carried by one of said screw members, and means cooperating with said pin for arranging an advancing article into a predetermined position.

9. In an apparatus for arranging articles, a pair of oppositely rotating parallel screw members having cooperating spiral ways for advancing articles, and a plurality of cooperating pins carried by said screw members for arranging an advancing article into a predetermined position.

10. In an apparatus for arranging articles, a pair of cooperating screw members for advancing an article, and means for yieldably and vertically supporting one of said screw members with respect to the other screw member.

11. In an apparatus for arranging articles, a screw mechanism comprising a pair of parallel screw devices for advancing an article and for arranging the advancing article into a predetermined position, and resilient means for guiding the article as it is advanced and arranged in said position.

12. In an apparatus for arranging articles, a screw mechanism for advancing an article, means carried by said screw mechanism for arranging the advancing article into a predetermined position, means for receiving a properly arranged article, and a guide rail disposed in alignment with the path of the advancing article for guiding a properly arranged article from said screw mechanism onto said receiving means.

13. In an apparatus for arranging articles, a screw mechanism for advancing and arranging an article into a predetermined position, means for receiving a properly positioned article, and means for yieldably supporting said receiving means.

14. In an apparatus for arranging articles, a screw mechanism comprising a pair of screw devices having spiral ways designed to receiving and advancing an article, and means means rotatable with one of the screw devices for engaging an article associated therewith.

15. In an apparatus for arranging articles, a rotatable member having a way for receiving and advancing an article, and means mounted thereon and rotatable therewith for arranging and advancing articles into a predetermined position.

16. In an apparatus for arranging articles, a rotatable member having a way for receiving and advancing articles, means mounted thereon and rotatable therewith for arranging an advancing article into a predetermined position, and means for ejecting improperly arranged articles.

17. In an apparatus for arranging articles, a rotatable member having a way for receiving and advancing articles, means mounted thereon and rotatable therewith for arranging an advancing article into a predetermined position, a magazine for receiving properly arranged articles, and means for ejecting improperly arranged articles.

In witness whereof, we hereunto subscribe our names this 28th day of May, A. D. 1926.

ROBERT HAND PATCHEN.
GEORGE LYNDEN ROCK.